(12) United States Patent
Hiltch et al.

(10) Patent No.: US 12,205,183 B2
(45) Date of Patent: Jan. 21, 2025

(54) TECHNIQUES FOR REAL-TIME TRANSACTIONAL DATA ANALYSIS

(71) Applicant: Skyline AI Ltd., Tel Aviv (IL)

(72) Inventors: Or Hiltch, Rishon LeZion (IL); Guy Zipori, Kfar Saba (IL); Shay Bushinsky, Ganey Tikva (IL)

(73) Assignee: SKYLINE AI LTD., Tel Aviv (IL)

( * ) Notice: Subject to any disclaimer, the term of this patent is extended or adjusted under 35 U.S.C. 154(b) by 450 days.

(21) Appl. No.: 16/177,722

(22) Filed: Nov. 1, 2018

(65) Prior Publication Data

US 2019/0130505 A1    May 2, 2019

Related U.S. Application Data

(60) Provisional application No. 62/580,785, filed on Nov. 2, 2017.

(51) Int. Cl.
*G06Q 50/16* (2024.01)
*G06F 18/23* (2023.01)
*G06N 20/00* (2019.01)
*G06Q 30/0204* (2023.01)

(52) U.S. Cl.
CPC ............. *G06Q 50/16* (2013.01); *G06F 18/23* (2023.01); *G06N 20/00* (2019.01); *G06Q 30/0204* (2013.01)

(58) Field of Classification Search
CPC .... G06Q 50/16; G06Q 30/0204; G06N 20/00; G06F 18/23
USPC ......................................................... 705/7.33
See application file for complete search history.

(56) References Cited

U.S. PATENT DOCUMENTS

| | | |
|---|---|---|
| 7,415,356 B1 | 8/2008 | Gowda et al. |
| 8,140,421 B1 | 3/2012 | Humphries et al. |
| 8,515,839 B2 | 8/2013 | Ma et al. |
| 8,676,680 B2 | 3/2014 | Humphries et al. |
| 9,605,704 B1 * | 3/2017 | Humphries ............ G06Q 10/10 |
| 2008/0077458 A1 | 3/2008 | Andersen et al. |
| 2015/0356576 A1 * | 12/2015 | Malaviya ........... G06Q 30/0202 705/7.31 |
| 2016/0292800 A1 * | 10/2016 | Smith .................... G06Q 50/16 |
| 2017/0236226 A1 * | 8/2017 | Malaviya ............... G06N 7/005 706/45 |

(Continued)

OTHER PUBLICATIONS

Caruana, et al., An Empirical Comparison of Supervised Learning Algorithms, Proceedings of the 23rd International Conference on Machine Learning (2006), available at https://www.cs.cornell.edu/~caruana/ctp/ct.papers/ caruana.icml06.pdf (Year: 2006).*

*Primary Examiner* — Charles Guiliano
(74) *Attorney, Agent, or Firm* — Troutman Pepper Hamilton Sanders LLP (57) ABSTRACT

A method and system analyzing transactional data are provided. The method includes gathering transaction data related to a first physical entity; extracting a first set of features representing the first entity; gathering transaction data related to a second physical entity, wherein the at least one second physical entity is indirectly related to the first physical entity; extracting at least a second set of features associated with the at least one second physical entity; matching the first set of features to the second set features; and clustering the first set of features and the second set of features, when the first set of features matches the second set of features.

19 Claims, 5 Drawing Sheets

(56) References Cited

U.S. PATENT DOCUMENTS

2018/0096362 A1* 4/2018 Kwan .................... G06Q 30/02

* cited by examiner

TECHNIQUES FOR REAL-TIME TRANSACTIONAL DATA ANALYSIS

CROSS-REFERENCE TO RELATED APPLICATIONS

This application claims the benefit of U.S. Provisional Application No. 62/580,785 filed on Nov. 2, 2017, the contents of which are hereby incorporated by reference.

TECHNICAL FIELD

The present disclosure relates generally to real-time analysis of real-time transactional data.

BACKGROUND

Even though technology became available in most industrial areas in the real-estate domain, a massive use of manual labor to perform tedious and costly steps still take place.

Commercial real estate is property that is used solely for business purposes and is leased out to provide a workspace rather than a living space. Ranging from a single gas station to a huge shopping center, commercial real estate includes retailers of all kinds: office space, hotels, strip malls, restaurants and convenience stores.

One of the biggest advantages of commercial real estate is the attractive leasing rates. In areas where new construction is either limited by land or law, commercial real estate can have impressive returns and considerable monthly cash flows. Industrial buildings generally rent at a lower rate, though they also have lower overhead costs compared to an office tower.

Commercial real estate also benefits from comparably longer lease contracts with tenants than residential real estate. This gives the commercial real estate holder a considerable amount of cash flow stability, as long as the building is occupied by long-term tenants.

Rules and regulations are the primary deterrent for most people wanting to invest in commercial real estate. The taxes, purchase mechanics and maintenance responsibilities for commercial properties are buried in layers of legalese that shift according to state, county, industry, size, zoning and many other designations. Most investors in commercial real estate either have specialized knowledge or a payroll of people who do.

Another hurdle is the increased risk brought with tenant turnover. With residences, the facilities requirements of a given tenant are almost the same as any previous or future tenant.

With a commercial property, each tenant may have very different needs that require costly refurbishing. The building owner then has to adapt the space to accommodate each tenant's specialized trade. A commercial property with low vacancy but high tenant turnover may still lose money due to the cost of renovations for incoming tenants.

The commercial real-estate investment process typically starts with deal sourcing, in which a search is performed for potential properties that meet the buyer requirements: e.g., budget, potential return-on-investment (ROI), units, class, location, property management fees and other ongoing expenses.

After a deal is sourced, an underwriting process is performed, which typically includes comparables (comps). Comps refer to properties with characteristics that are like the sourced deal whose value is being sought.

When performing a real estate appraisal, this can be accomplished either by a real estate agent attempting to establish the value of a potential client's home or property through market analysis, or, by a licensed or certified appraiser or a surveyor using more defined methods.

The comps analyzed, are typically very similar to the sourced deal by characteristics, location, and so on. Therefore, the transaction data utilized to prepare the comps for each deal is typically limited, and therefore, accurate or reliable comps may not be established.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments include herein a method for analyzing transactional data. The method comprising gathering transaction data related to a first physical entity; extracting a first set of features representing the first entity; gathering transaction data related to a second physical entity, wherein the at least one second physical entity is indirectly related to the first physical entity; extracting at least a second set of features associated with the at least one second physical entity; matching the first set of features to the second set features; and clustering the first set of features and the second set of features, when the first set of features matches the second set of features.

Certain embodiments include herein a system for system for analyzing transactional data. The system comprising a processing circuitry; and a memory, the memory containing instructions that, when executed by the processing circuitry, configure the system to: gather transaction data related to a first physical entity; extract a first set of features representing the first entity; gather transaction data related to a second physical entity, wherein the at least one second physical entity is indirectly related to the first physical entity; extract at least a second set of features associated with the at least one second physical entity; match the first set of features to the second set features; and cluster the first set of features and the second set of features, when the first set of features matches the second set of features.

BRIEF DESCRIPTION OF THE DRAWINGS

The subject matter that is regarded as the disclosure is particularly pointed out and distinctly claimed in the claims at the conclusion of the specification. The foregoing and other objects, features and advantages of the disclosure will be apparent from the following detailed description taken in conjunction with the accompanying drawings.

DETAILED DESCRIPTION

It is important to note that the embodiments disclosed herein are only examples of the many advantageous uses of the teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 1:
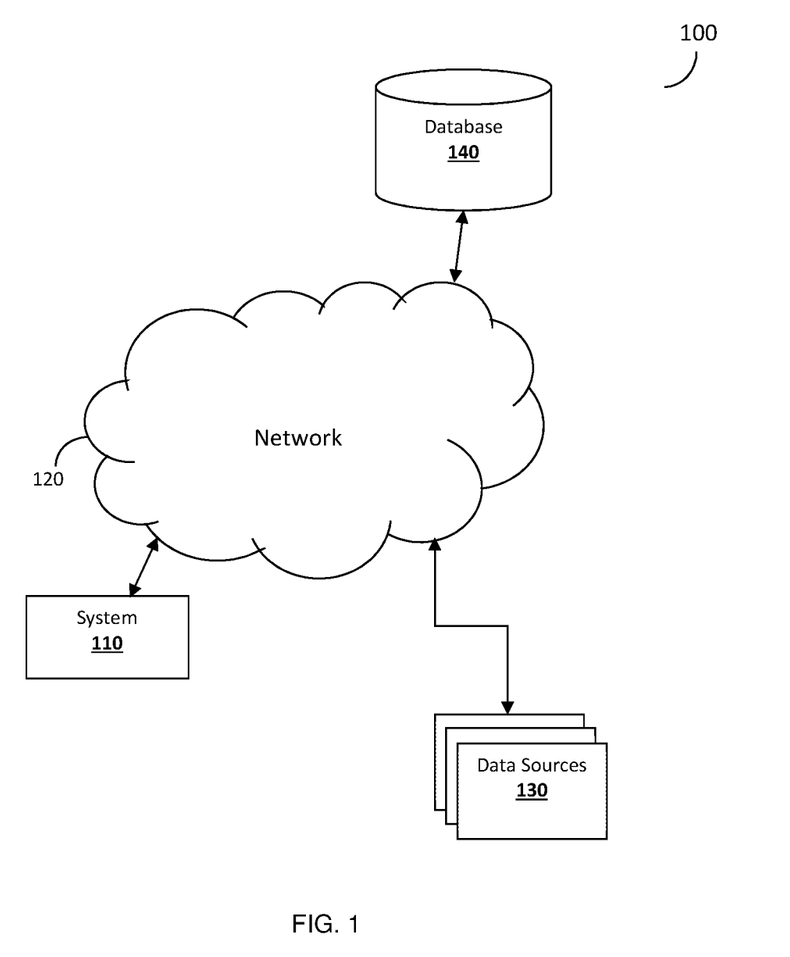
FIG. 1 is a schematic network diagram utilized to discuss the various embodiments.

FIG. 1 is an example of a schematic network diagram 100, utilized to describe the disclosed embodiments. The network diagram 100 depicts a transactional analyzing system (hereinafter the system 110) connected to a network 120. The network 120 may be the Internet, the world-wide-web (WWW), a local area network (LAN), a wide area network (WAN), a metro area network (MAN), and other networks capable of enabling communication between the system 100 and other device(s) over the network. Also connected to the network 120 is a plurality of transactional data sources: 130 and a database 140.

According to the disclosed embodiments, the system 110 is configured to analyze transaction data to cluster and evaluate real-estate properties. Such properties may include commercial real-estate, a multi-family house, a residential building, and the like. In a preferred embodiment, the transaction data relates to properties that do not demonstrate any direct connections. For example, the properties are geographically distributed.

In an embodiment, the system 110 is configured to identify connections among real-estate properties that are not directly connected. To this end, the system 110 is configured to identify in the transactional data, features (or characteristics) related to the real-estate properties. Using the identified features, the system 110 is configured to model the real-estate properties. The modeled real-estate properties are compared to each other. Two or more properties are determined to be similar based on one or more matching features. A cluster is created by including two or more real-estate properties determined to be similar. The system 110 is further configured to match between clusters to generate insights based on the respective thereof. As will be discussed below, in an embodiment, the system 110 implements machine learning techniques to identify similar real-estate properties.

According to some embodiments, the system 110 is configured to utilize information retrieved from external sources 130. Such sources 130 include governmental databases, real-estate comparison websites, such as Zillow®, geo-location databases, demographic databases, and the like.

The system 110 is configured to extract features associated with the real-estate property from the external sources. The features are associated with one or more transactions made with respect to real-estate properties being analyzed.

The extracted features are saved in a database 140. A match is then performed between real-estate properties using the extracted features. Upon determination of a match between two or more matching (similar) real-estate properties a cluster is created. In an embodiment, the matching for similar real-estate properties may be performed using a classifier implementing supervised machine learning. For example, such a classifier can be realized as a random forest, a boosted tree, and the like of other decision or classification trees.

The system 110 is further configured to receive a request to generate comps with respect to a particular real-estate property. The system 110 is configured to search for one or more clusters matching the real-estate property. The comps' analytics are generated based on matching cluster(s). The generated comps' analytics may be displayed as part of a report.

It should be further noted that the embodiments disclosed herein are not limited to the specific architecture illustrated in FIG. 1 and other architectures may be equally used without departing from the scope of the disclosed embodiments.

Figure 2:
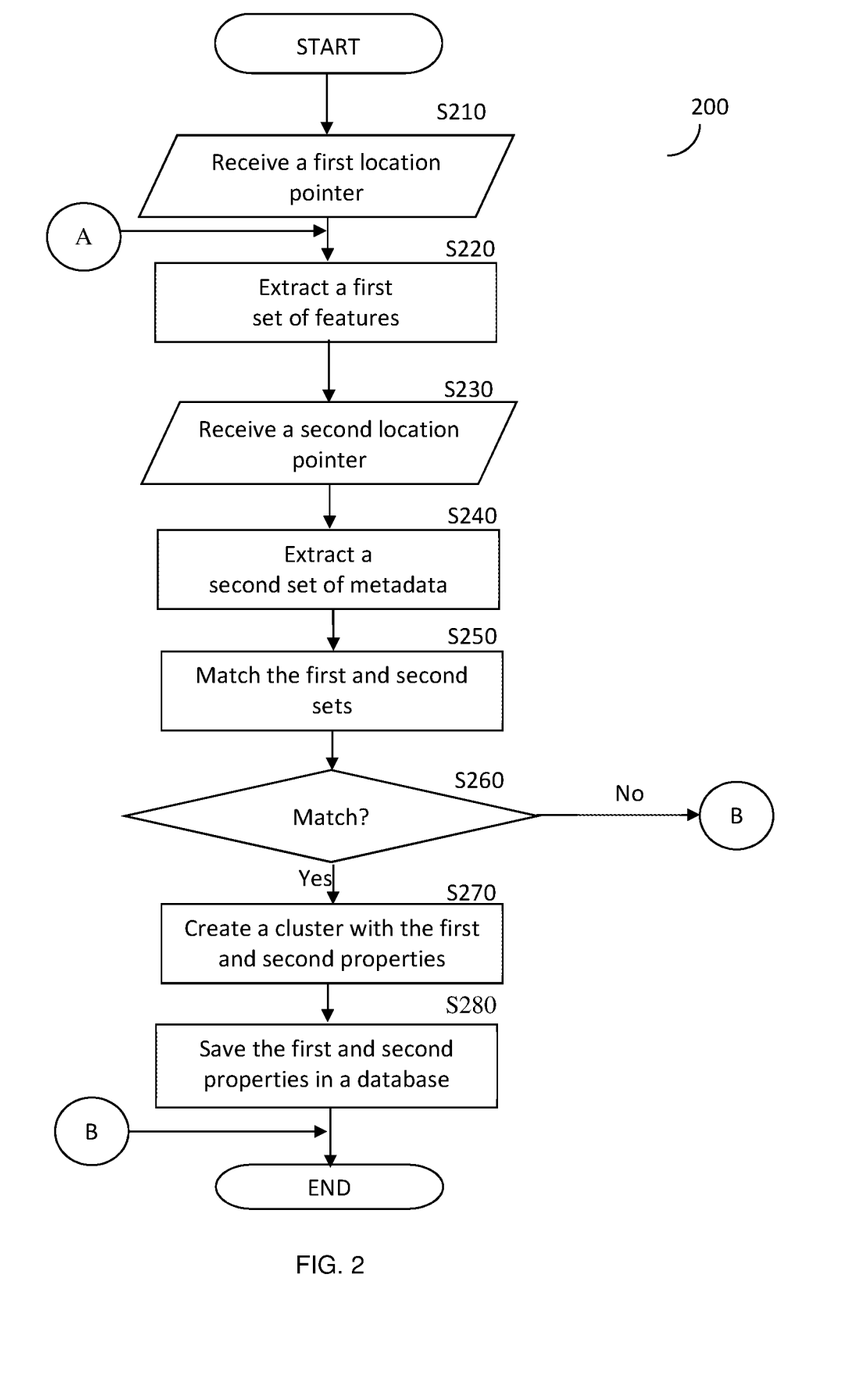
FIG. 2 is a flowchart describing a method for clustering indirect real-estate properties according to an embodiment.

FIG. 2 depicts an example flowchart 200 describing a method for clustering indirectly related real-estate properties according to an embodiment. At S210, a first location pointer, associated with a first real-estate property, is received. The location pointer may be, for example, an address of the property.

At S220, transaction data related to the first real-estate property are retrieved. S220 further includes extracting, from the retrieved transaction data, features related to the first real-estate property.

At S230, a second location pointer associated with a second real-estate property is received. The second property is not directly related to the first property. That is, the first and second properties are different subdivisions, are of different types, are at different geographical areas and so on.

At S240, transaction data related to the second real-estate property are retrieved. S240 further includes extracting, from the transaction data, features related to the second real-estate property.

At S250, the features of the first property are matched to the features of the second property. At S260, it is determined if the features are a match above a certain predetermined threshold, and if so, execution continues with S270; otherwise, execution continues with S280.

At S270, a cluster is generated with respect of the first and second properties. It should be noted that the properties can be added to an existing cluster. At S280, the new or updated cluster is saved in a database.

As a non-limiting example, an industrial factory in Chicago Illinois, may be indirectly connected to an office building in Atlanta, Ga. by lease characteristics, ongoing fees, future expected ROI, county progress, etc. In such case, a cluster is to be generated to include the properties.

Figure 3:
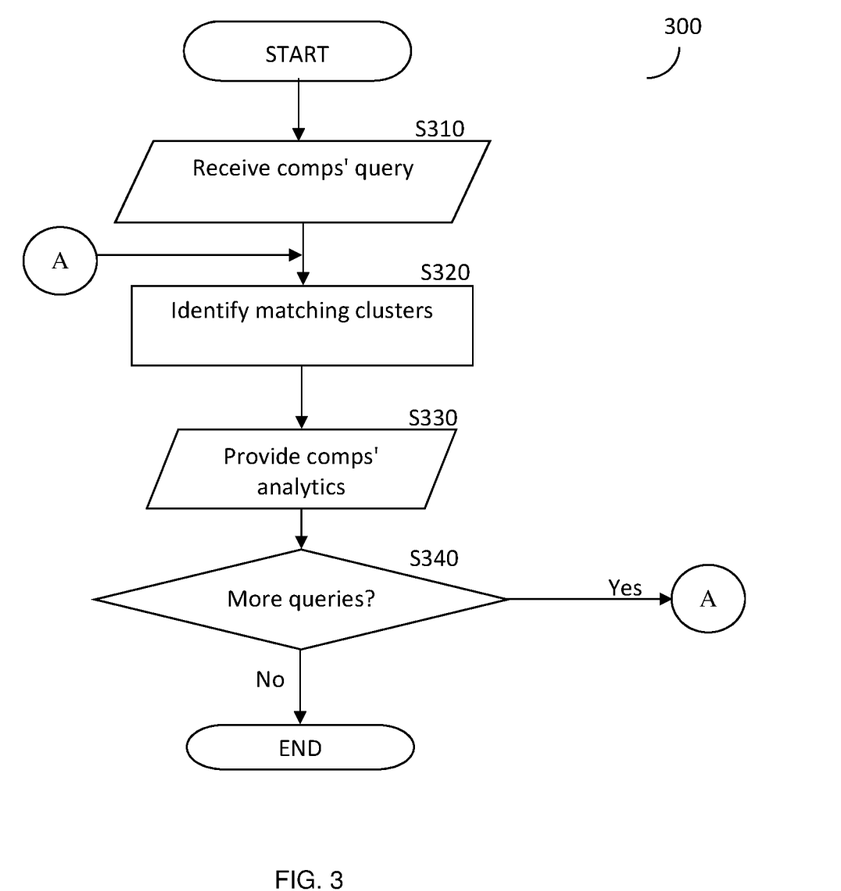
FIG. 3 is a flowchart describing a method for comparing indirect real-estate properties using clusters according to an embodiment.

FIG. 3 is an example flowchart 300 describing a method for performing comps' analysis for indirect properties according to an embodiment. At S310, at least one comps' query is received. The query includes details regarding a real-estate property, for example: a location pointer.

At S320, one or more clusters matching the real-estate property are identified. Thereafter, a match is performed between the real-estate property and the one or more real-estate properties included in each of the identified clusters.

At S330, a comps' analytics report is generated and provided respective of the match. At S340, it is checked whether additional queries are received and if so, execution continues with S320; otherwise, execution terminates.

It should be clear for one of ordinary skill in the art that the operation of a method for identifying indirectly related real-estate properties and generating a cluster respective thereof according to an embodiment as described with respect of FIG. 2 and the operation of a method for describing a method for comparing indirect CREs using clusters according to an embodiment as described with respect of FIG. 3, can be integrated without departing from the scope of the disclosure.

Figure 4:
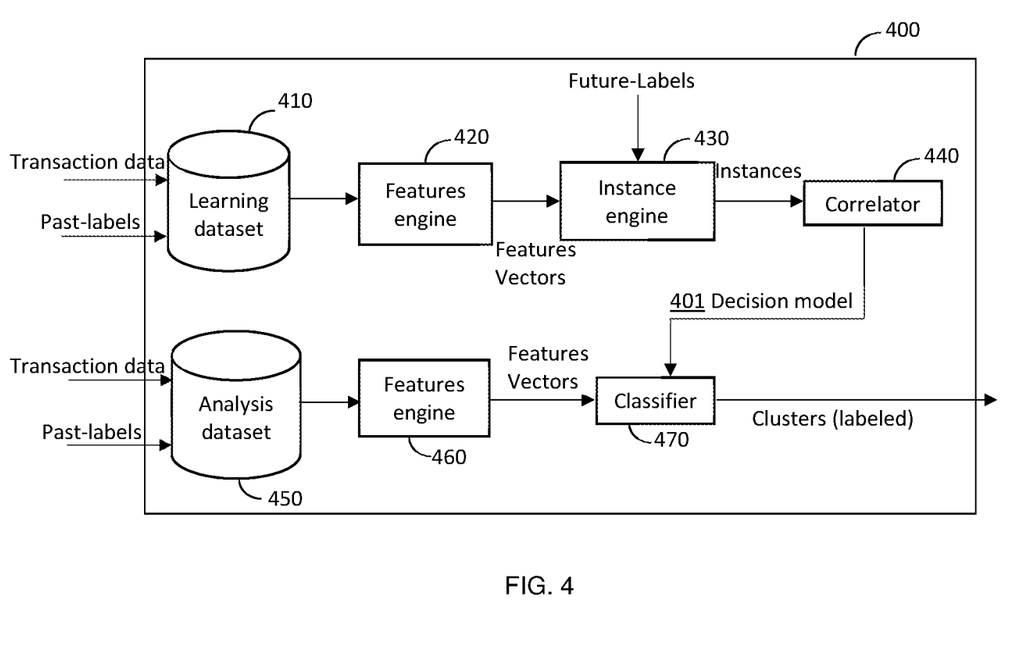
FIG. 4 is a schematic diagram of a supervised machine learning module utilized to cluster indirect real-estate properties according to an embodiment.

FIG. 4 is a schematic diagram of a supervised machine learning module 400 utilized to cluster real-estate properties according to an embodiment.

The module 400 operates in two phases: learning and analysis. In the learning phase, a decision model 401 is generated and trained, while in the analysis phase, the decision model 401 is utilized for analysis or prediction of the existence botnets in the cloud-computing infrastructure. In each phase, different datasets and processes are utilized.

In the learning phase, transaction data received from the various sources (130, FIG. 1) are aggregated and saved as a learning dataset 410. The transaction data saved in the learning dataset 410 may be labeled indicating, for example, previously created clusters of properties. The aggregation of events is for a predefined time window.

The learning dataset 410 is connected to a feature engine 420 configured to generate a features vector for a property. A features vector may be based on a set of features characterizing the property including, but not limited to, financial transactions related to the property. The features may include, but are not limited to, specification of the property (e.g., size, construction type, and so on.), transactions attributes (e.g., transaction amount), crime statistics, satellite imagery, property parameters (e.g., location), demographics, paid rent, occupancy, property taxes, and so on.

In an embodiment, to generate a features vector, the aggregated and label transactional data is analyzed, and the relevant features are extracted therefrom. As an example, property taxes paid on the property are executed from tax records for the property.

An instance engine 430 is configured to produce an instance for a property by labeling the respective features vector with future-labels. The future-labels are labels generated at a time later than the past-labels (i.e., the past-labels included in the learning dataset 410). Therefore, each instance is a pair including a features vector and a label (indicating a cluster) at a given time. The features vector represents an input to a classifier 470, and the label is a desired output value of the classifier 470. The instances of properties to be clustered are input to the correlator 440.

In an embodiment, the correlator 440 is configured to implement a supervised machine learning algorithm for analyzing instances and generating a decision model (or an inferred function). Examples for the supervised machine learning algorithm include SVM, Logistic Regression, Gradient Boosted Decision Trees, and/or the like. The decision model, generated by the correlator 440, is used to map or correlate unseen vectors to the labels indicating a property for clustering. The unseen vectors are analyzed during the analysis phase.

In an embodiment, during the analysis phase, transaction data related to a real-estate property is retrieved from the analysis dataset 450. The database 450 includes transaction data gathered over time. Labels in the dataset 450 are neither past-labels nor future-labels used during the learning phase.

The analysis dataset 450 is input for the feature engine 460. The features engine 460 is configured to generate a features vector for a real-estate property. A features vector is based on a set of features representing the property.

The generated features vectors are fed to the classifier 470. The classifier 470 is configured to output a decision labeling for clustering. The labeling is based on the decision model 401 and the features vector of the respective property. The classifier 470 can be implemented using known classifying techniques utilized in the supervised machine learning. For example, the classifier 470 can be implemented as a boosted tree, a random forest, and the like of other decision or classification trees.

In an example embodiment, any of the feature generators 420 and 460, the instance engine 430, the correlator 440, and the classifier 470, can be realized by one or more hardware logic components, circuits, or both. For example, and without limitation, illustrative types of hardware logic components that can be used include Field Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information.

The datasets 410 and 450 can be stored in a memory, which can be volatile (e.g., RAM, etc.) memory, non-volatile (e.g., ROM, flash memory, etc.) memory, or a combination thereof. Alternatively or collectively, the datasets 410 and 450 can be stored in a storage, such as a magnetic storage, optical storage, and the like and may be realized, for example, as flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information.

Figure 5:
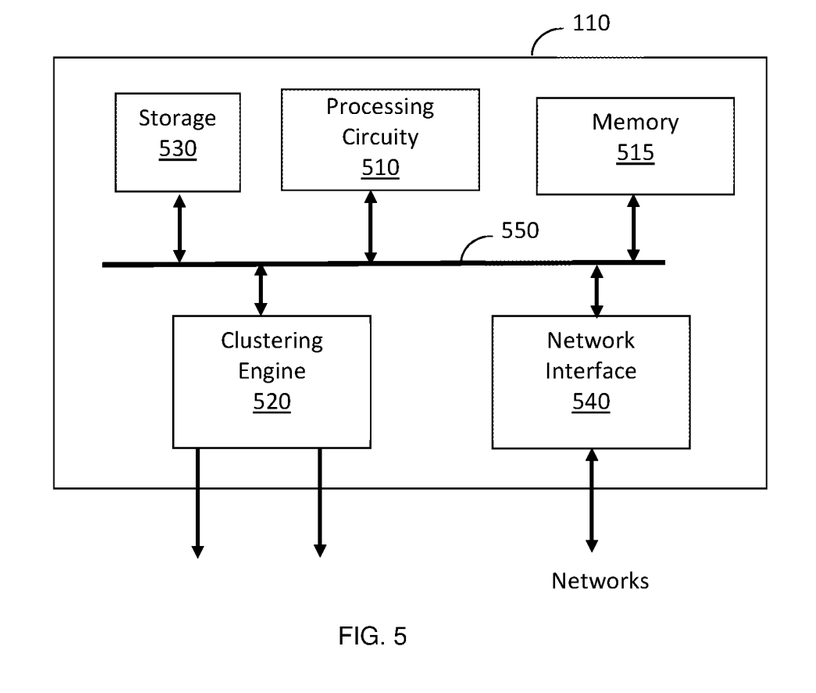
FIG. 5 is an example block diagram of a system for clustering and evaluating clustering indirect real-estate properties according to an embodiment.

FIG. 5 shows an example block diagram of the system 110 constructed according to an embodiment. The system 110 includes a processing circuitry 510 coupled to a memory 515, a clustering engine 520, a storage 530, and a network interface 540. In an embodiment, the components of the botnet system 110 are coupled or connected to a communication bus 550.

The processing circuitry 510 may be realized by one or more hardware logic components and circuits. For example, and without limitation, illustrative types of hardware logic components that can be used include: FPGAs, ASICs, ASSPs, SOCs, CPLDs, general-purpose microprocessors, microcontrollers, DSPs, and the like, or any other hardware logic components that can perform calculations or other manipulations of information. The memory 515 may be volatile (e.g., RAM, etc.), non-volatile (e.g., ROM, flash memory, etc.), or a combination thereof.

The storage 530 may be magnetic storage, optical storage, and the like and may be realized, for example, as flash memory or other memory technology, CD-ROM, DVDs or other optical storage, magnetic cassettes, magnetic tape, magnetic disk storage or other magnetic storage devices, or any other medium which can be used to store the desired information.

In one configuration, computer readable instructions to implement one or more embodiments disclosed herein may be stored in the storage 530. The storage 530 may also store other computer readable instructions to implement an operating system, an application program, and the like. Computer readable instructions may be loaded in the memory 515 for execution by the processing circuitry 510. The storage 530 is configured to store, for example, access policies, client certificates, authentication tokens, device postures of client devices, device histories, user account histories, and other information that can be for authentication.

In another embodiment, the storage 530, the memory 515, or both, are configured to store software. Software shall be construed broadly to mean any type of instructions, whether referred to as software, firmware, middleware, microcode, or hardware description language. Instructions may include code (e.g., in source code format, binary code format, executable code format, or any other suitable format of code). The instructions, when executed by the one or more processors, cause the processing circuitry 510 to perform the various functions described herein.

The network interface 540 allows the system 110 to communicate with other external sources. For example, the interface 540 is configured to allow the transaction data sources 130.

In an embodiment, the network interface 540 allows remote access to the system 100 for the purpose of, for example, configuration, reporting, and the like. The network interface 540 may include a wired connection or a wireless connection. The network interface 540 may transmit communication media, receive communication media, or both. For example, the network interface 540 may include a modem, a network interface card (NIC), an integrated network interface, a radio frequency transmitter/receiver, an infrared port, a USB connection, and the like.

The clustering engine 520 is configured to cluster real-estate properties using a supervised machine learning decision model, as discussed in detail with reference to FIG. 4. In an embodiment, the engine 520 can be realized by one or more hardware logic components and circuits. For example, and without limitation, illustrative types of hardware logic components that can be used include: FPGAs, ASICs, ASSPs, SOCs, CPLDs, general-purpose microprocessors, DSPs, and the like, or any other hardware logic components that can perform calculations or other manipulations of information.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and a microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method comprising:
   generating and training a decision model by:
   retrieving, from external databases and websites, transaction data;
   generating a learning dataset to train the decision model by:
   aggregating and saving the transaction data retrieved from the external databases and websites as the learning dataset; and
   labeling the transaction data saved as the learning dataset with labels indicating clusters of properties; and
   training the decision model using the learning set by:
   configuring the decision model to map unseen vectors of a property to the labels indicating clusters of properties;
   producing an instance for the property by labeling respective extracted features vectors with future-labels, wherein the instance is a pair comprising a features vector and a label, wherein the future-labels are labels generated at a time later than past-labels from the learning dataset; and
   implementing a supervised machine learning algorithm configured to analyze the instance and generate the decision model; and
   generating and displaying a comparable using the decision model by:
   retrieving, from the external databases and websites, additional transaction data related to a first physical entity;
   extracting from the additional transaction data related to the first physical entity a first set of features representing the first physical entity;
   saving the first set of the features to a database;
   generating a first feature vector based on the first set of the features saved to the database;
   retrieving, from the external databases and websites, additional transaction data related to a second physical entity, wherein the second physical entity is indirectly related to the first physical entity;
   extracting from the additional transaction data related to the second physical entity a second set of features associated with the second physical entity;
   generating a second feature vector based on the second set of the features;
   creating a classifier configured to output a decision labeling for clustering based on the decision model and the first and the second feature vectors;
   applying the classifier to implement supervised machine learning to match the first set of the features to the second set of the features;
   clustering the first physical entity and the second physical entity to generate a cluster of the first physical entity and the second physical entity, when the first set of the features matches the second set of the features;

changing at least one of the first physical entity from the plurality of the physical entities or the second physical entity from the plurality of the physical entities to be a different one of the physical entities and repeating the first phase until each of the physical entities from the plurality of the physical entities has had its extracted features matched against extracted features of other physical entities;

generating a comps data list for a specified third physical entity based on the cluster of the first physical entity and the second physical entity and features of the specified third physical entity; and generating and transmitting an interface comprising the comps data list to a device for display.

2. The computerized method of claim 1, wherein the first physical entity is a real-estate property and the second physical entity is a second different real-estate property.

3. The computerized method of claim 1, wherein clustering the first physical entity and the second physical entity further comprises creating a new cluster or updating an existing cluster.

4. The computerized method of claim 1, wherein a feature of the first set of features and the second set of features is any one of: specification of real-estate property, transactions attribute, crime statistics, satellite imagery, property parameters, demographics, paid rent, occupancy, and property taxes.

5. The computerized method of claim 1, wherein the first set of features is considered to match to the second set of features when the first set of the features are a match to the second set of the features above a pre-set threshold.

6. The computerized method of claim 2, wherein the real-estate property and the second different real-estate property are indirect real-estate properties in that the real-estate property and the second different real-estate property are located at different geographic areas.

7. The computerized method of claim 2, wherein the real-estate property and the second different real-estate property are indirect real-estate properties in that the real-estate property and the second different real-estate property are each of a different type.

8. The computerized method of claim 2, wherein the third physical entity is a third real-estate property and at least two of the real-estate properties, the second different real-estate property, and the third real-estate property are indirectly related real-estate properties, wherein indirectly related real-estate properties are at least one of located at different geographic areas and of a different type.

9. The computerized method of claim 1, wherein the second phase further comprises:
receiving an indication of the third physical entity;
retrieving, from the external databases and websites, third transaction data related to the third physical entity;
extracting a set of features representing the third physical entity;
comparing the third physical entity to each existing cluster developed in the first phase; and
generating the list of physical entities that belong to one or more clusters the features of which that caused the physical entities to be clustered match the features representing the third physical entity.

10. A non-transitory computer readable medium having stored thereon instructions for causing a server to execute a method for analyzing transactional data comprising:

generating and training a decision model by:
executing a first phase for identifying connections among a plurality of physical entities that are not directly connected, the first phase comprising:
retrieving, from external databases and websites, transaction data;
generating a learning dataset to train the decision model by:
aggregating and saving the transaction data retrieved from the external databases and websites as the learning dataset; and
labeling the transaction data saved as the learning dataset with labels indicating clusters of properties; and
training the decision model using the learning set by:
configuring the decision model to map unseen vectors of a property to the labels indicating clusters of properties;
producing an instance for the property by labeling respective extracted features vectors with future-labels, wherein the instance is a pair comprising a features vector and a label, wherein the future-labels are labels generated at a time later than past-labels from the learning dataset: and
implementing a supervised machine learning algorithm configured to analyze the instance and generate the decision model; and
generating and displaying a comparable using the decision model by:
retrieving, from the external databases and websites, additional transaction data related to a first physical entity;
extracting from the additional transaction data related to the first physical entity a first set of features representing the first physical entity;
saving the first set of the features to a database;
generating a first feature vector based on the first set of the features saved to the database;
retrieving, from the external databases and websites, additional transaction data related to a second physical entity, wherein the second physical entity is indirectly related to the first physical entity;
extracting from the additional transaction data related to the second physical entity a second set of features associated with the second physical entity;
generating a second feature vector based on the second set of the features;
creating a classifier configured to output a decision labeling for clustering based on the decision model and the first and the second feature vectors;
applying the classifier to implement supervised machine learning to match the first set of the features to the second set of the features;
clustering the first physical entity and the second physical entity to generate a cluster of the first physical entity and the second physical entity, when the first set of the features matches the second set of the features;
changing at least one of the first physical entity from the plurality of the physical entities or the second physical entity from the plurality of the physical entities to be a different one of the physical entities and repeating the first phase until each of the physical entities from the plurality of the physical entities has had its extracted features matched against the extracted features of other physical entities;

executing a second phase for generating a comps data list for a specified third physical entity based on the cluster of the first physical entity and the second physical entity and features of the specified third physical entity; and, wherein the execution of the second phase supplies the generated comps data list as a human perceivable output; and generating and transmitting an interface comprising the comps data list to a device for display.

11. A system for analyzing transactional data, comprising:

a processing circuitry; and a memory, the memory containing instructions that, when executed by the processing circuitry, configure the system to:
- generate and train a decision model by executing a first phase for identifying connections among a plurality of physical entities that are not directly connected, the first phase comprising:
  - retrieving, from external databases and websites, transaction data;
  - generating a learning dataset to train the decision model by:
    - aggregating and saving the transaction data retrieved from the external databases and websites as the learning dataset; and
    - labeling the transaction data saved as the learning dataset with labels indicating clusters of properties;
  - training the decision model using the learning set by:
    - configuring the decision model to map unseen vectors of a property to the labels indicating clusters of properties;
    - producing an instance for the property by labeling respective extracted features vectors with future-labels, wherein the instance is a pair comprising a features vector and a label, wherein the future-labels are labels generated at a time later than past-labels from the learning dataset; and
    - implementing a supervised machine learning algorithm configured to analyze the instance and generate the decision model; and
  - generate and display a comparable using the decision model by:
- retrieving, from the external databases and websites, additional transaction data related to a first physical entity;
- extracting from the additional transaction data related to the first physical entity a first set of features representing the first physical entity;
- saving the first set of the features to a database;
- generating a first feature vector based on the first set of the features saved to the database;
- retrieving, from the external databases and websites, additional transaction data related to a second physical entity, wherein the second physical entity is indirectly related to the first physical entity;
- extracting from the additional transaction data related to the second physical entity a second set of features associated with the second physical entity;
- generating a second feature vector based on the second set of the features;
- creating a classifier configured to output a decision labeling for clustering based on the decision model and the first and the second feature vectors;
- applying the classifier to implement supervised machine learning to match the first set of the features to the second set of the features;
- clustering the first physical entity and the second physical entity to generate a cluster of the first physical entity and the second physical entity, when the first set of the features matches the second set of the features;
- changing at least one of the first physical entity from the plurality of the physical entities or the second physical entity from the plurality of the physical entities to be a different one of the physical entities and repeating the first phase until each of the physical entities from the plurality of the physical entities has had its extracted features matched against the extracted features of other physical entities;
- executing a second phase for generating a comps data list for a specified third physical entity based on the cluster of the first physical entity and the second physical entity and features of the specified third physical entity; and, wherein the execution of the second phase supplies the generated list of comps as a human perceivable output; and
- generating and transmitting an interface comprising the comps data list to a device for display.

12. The system of claim 11, wherein the first physical entity is a real-estate property and the second physical entity is a second different real-estate property.

13. The system of claim 12, wherein clustering of the first physical entity and the second physical entity further comprises creating a new cluster or updating an existing cluster.

14. The system of claim 11, wherein a feature of the first set of features and the second set of features is any one of: specification of real-estate property, transactions attribute, crime statistics, satellite imagery, property parameters, demographics, paid rent, occupancy, and property taxes.

15. The system of claim 11, wherein the first set of features is considered to match to the second set of the features when the first set of features are a match to the second set of the features above a pre-set threshold.

16. The system of claim 12, wherein indirect real-estate properties are properties located at different geographic areas.

17. The system of claim 12, wherein the real-estate property and the second different real-estate property are indirect real-estate properties in that the real-estate property and the second different real-estate property are located at different geographic areas.

18. The system of claim 12, wherein the third physical entity is a third real-estate property and at least two of the real-estate property, the second different real-estate property, and the third real-estate property are indirectly related real-estate properties, wherein the indirectly related real-estate properties are at least one of located at different geographic areas and of a different type.

19. The system of claim 11, wherein, to implement the second phase, the system is further configured to:
- receive an indication of the third physical entity;
- retrieve, from the external databases and websites, third transaction data related to the third physical entity;
- extract a set of features representing the third physical entity;
- compare the third physical entity to each existing cluster developed in the first phase; and
- generate the list of physical entities that belong to one or more clusters the features of which that caused the physical entities to be clustered match the features representing the third physical entity.

\* \* \* \* \*